United States Patent [19]

Oetiker

[11] Patent Number: 5,274,886
[45] Date of Patent: Jan. 4, 1994

[54] CLAMP STRUCTURE WITH PREASSEMBLY ARRANGEMENT

[75] Inventor: Hans Oetiker, Horgen, Switzerland

[73] Assignee: Hans Oetiker AG Maschinen- und Apparatefabrik, Horgen, Switzerland

[21] Appl. No.: 942,694

[22] Filed: Dec. 17, 1986

[51] Int. Cl.⁵ .............................................. F16L 33/02
[52] U.S. Cl. ................................. 24/20 TT; 24/20 R
[58] Field of Search ............................................ 24/16

[56] References Cited

U.S. PATENT DOCUMENTS

| | | | |
|---|---|---|---|
| 1,107,750 | 8/1914 | Boye | 24/599 |
| 1,593,452 | 7/1926 | Hertzman | 24/580 |
| 2,405,912 | 8/1946 | Tinnerman | 24/20 TT |
| 3,426,400 | 2/1969 | Lauro | 24/599 |
| 4,299,012 | 11/1981 | Oetiker | 24/20 CW X |
| 4,340,996 | 7/1982 | Storace | 24/20 R |
| 4,492,004 | 1/1985 | Oetiker | 24/20 EE X |

FOREIGN PATENT DOCUMENTS 136943 12/1919 United Kingdom .................. 24/599

*Primary Examiner*—James R. Brittain
*Attorney, Agent, or Firm*—Paul M. Craig, Jr.

[57] ABSTRACT

An open clamp structure, especially for earless clamp structures which includes a clamping band with a mechanical interlock in the form of at least one outwardly extending hook in the inner band portion adapted to engage in an aperture of the outer band portion; a preassembly hook is provided in the inner band portion to assure a reliable preassembly of the clamp structure; the preassembly hook is thereby so constructed that it permits a snap-in like engagement of the outer band portion in the preassembled position in which the outer band portion is held until released therefrom when the clamp is tightened into its final assembly condition.

20 Claims, 1 Drawing Sheet

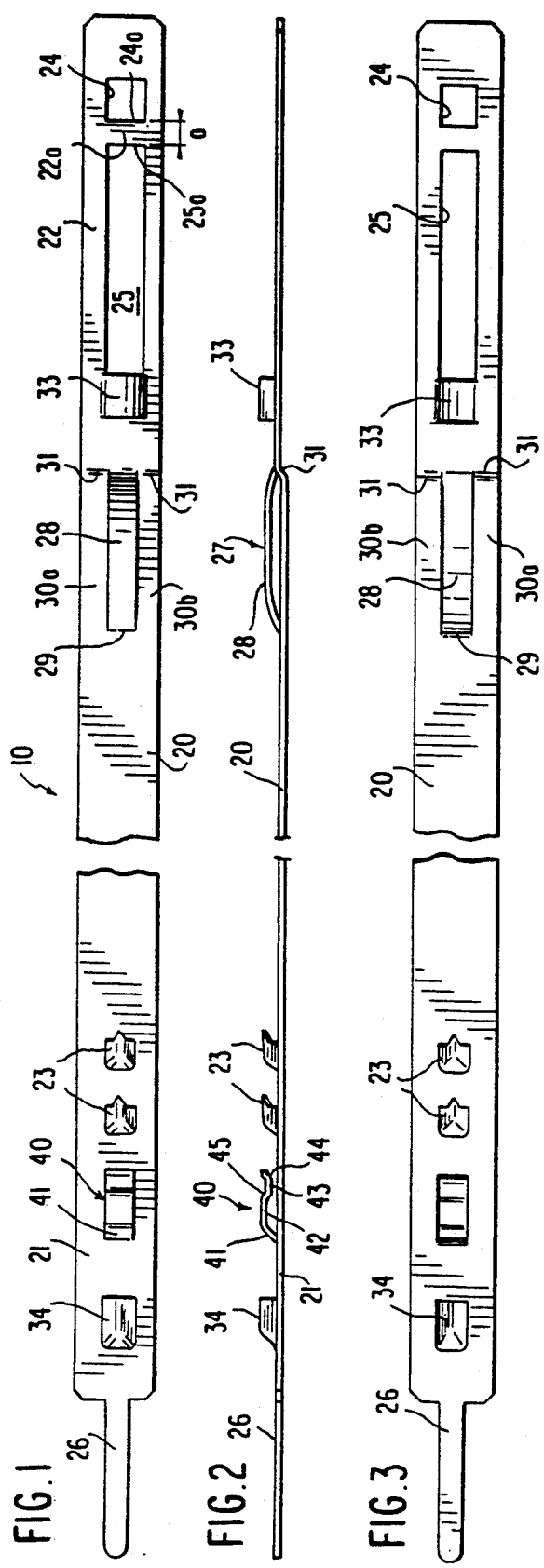
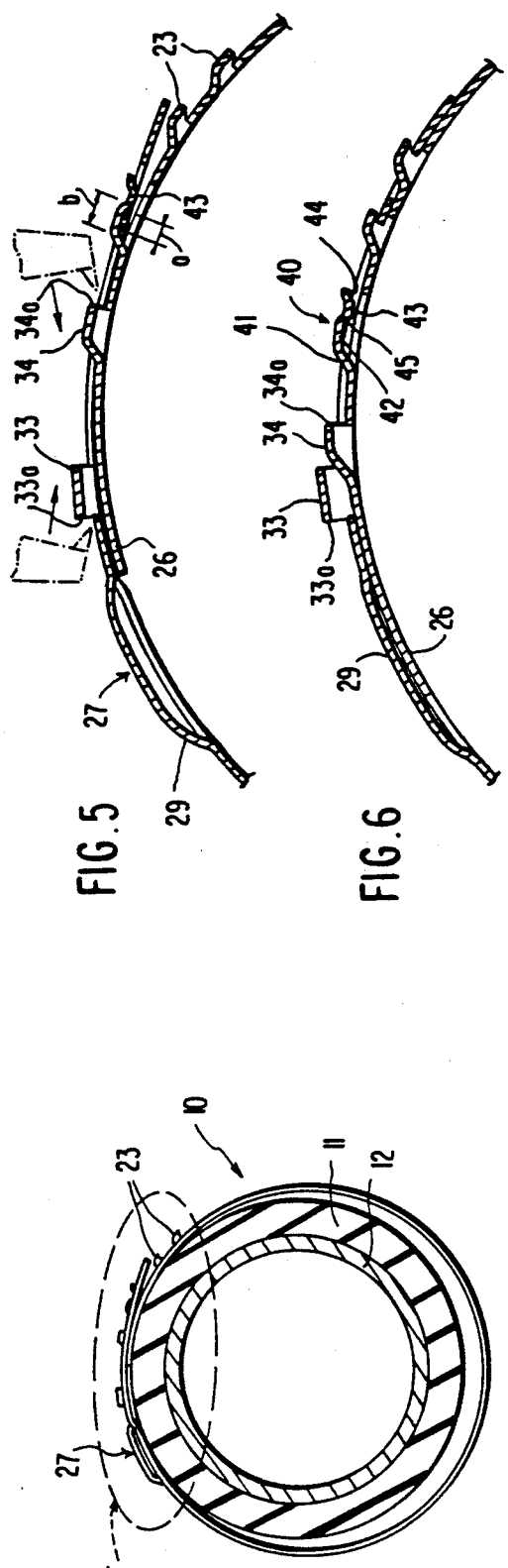

CLAMP STRUCTURE WITH PREASSEMBLY ARRANGEMENT

FIELD OF INVENTION

The present invention relates to an open clamp structure which is provided with a preassembly arrangement for holding the clamp structure in a preassembled condition.

PRIOR ART

Open clamp structures which are adapted to be mechanically interconnected are known in the prior art, for example, as disclosed in my prior U.S. Pat. Nos. 2,847,742; 3,082,498; 3,321,811; 3,082,498; 3,475,793; 3,523,337; 4,299,012 and 4,315,348. These open clamp structures can be assembled in two different ways. On the one hand, when an axial assembly of the clamp structure is not possible, they can be installed in the open condition, preferably preformed into at least approximately complementary circular shape of the object to be fastened, in which case they have to be elastically opened to be placed about the object to be fastened. A second approach is to preassemble the open clamp into a closed clamp by engaging the outwardly extending hooks into the corresponding apertures and mounting the thus-preassembled clamp axially over the object to be fastened. In the latter case, however, this is possible only if the clamp can be slipped over the object to be fastened, i.e., when it is of sufficiently larger diameter with the hooks engaging in the apertures. With the use of a tightening means, for example, in the form of a so-called "Oetiker" ear as disclosed in my aforementioned prior patents or with a threaded means as disclosed, for example, in my prior U.S. Pat. No. 4,521,940, this poses no problem. However, if the clamp structure is for use in applications in which space conditions do not permit any projecting parts, such as a plastically deformable ear or tightening devices for contracting the clamp structure about the object to be fastened, then such assembly in the axial direction of the preassembled clamp is, for all practical purposes, impossible. The former approach entails similar difficulties in case an earless clamp is used because it becomes difficult to engage the tightening tool while the clamp is opened as the teeth will engage in the corresponding apertures only when the clamp has been contracted at least nearly into its installed condition.

My prior U.S. Pat. No. 4,492,004 attempted to solve this problem by providing an approximately L-shaped hook in the inner band portion which was intended to be bent over the corresponding outer band portion. However, this prior art arrangement did not assure a sufficiently reliable preassembly, particularly for use on the assembly line, when installing an earless clamp of the type disclosed in my prior U.S. Pat. No. 4,492,004 which requires the use of a special tool for final assembly of the earless clamp structure.

SUMMARY OF THE INVENTION

It is therefore a principal object of the present invention to avoid the shortcomings of the prior art and to provide a preassembly arrangement, especially for earless clamps, which is simple in construction, reliable in operation and relatively inexpensive in manufacture as well as easy to install.

The underlying problems are solved according to the present invention in that the preassembly position is realized by a snap-in engagement with the use of a preassembly hook in the inner band portion which can be readily disengaged again during tightening in the final installation of the clamp structure when the hook(s) of the mechanical interlock engage in the corresponding aperture(s). In a preferred embodiment of the present invention, the preassembly hook providing the preassembly means extends away from the free end of the inner band portion, is punched out of the band material and in a first part thereof extends a relatively small distance outwardly from the outer surface of the clamping band to pass over into a second, relatively larger part extending at least approximately parallel to the outer surface of the clamping band whereby a constriction in the second part provides in conjunction with the elastically deformable preassembly hook the engagement by snap-in action.

According to another feature of the present invention, the constriction is realized by an approximately U-shaped depression in the second part, as viewed in side view of the clamp structure. Such approximately U-shaped depression can be readily manufactured at relatively low cost, even if it is decided to have the depression extend over the entire width of the hook to assure reliable operation.

The outer band portion is thereby provided with an aperture of such size that the preassembly hook can extend therethrough and the transverse end wall of the aperture can then engage into the space between the outer surface of the clamping band and the inner surface of the preassembly hook after elastically prying open the constriction by forcing the transverse end wall of the aperture into this space.

According to another feature of the present invention, the constriction formed by the U-shaped depression is spaced from the first part of the preassembly hook a distance at least equal to the spacing between the aperture receiving the preassembly hook and the next-adjacent aperture intended to receive a support hook of the mechanical interlock. In the preassembled condition, the constriction is thereby adapted to engage in the aperture for the support hook so that retention of the preassembly condition of the clamp structure is further assured. The leg of the U-shaped depression, away from the free end of the inner band portion may thereby extend obliquely outwardly so as to provide a guide surface to facilitate the snap-in engagement of the preassembly condition.

BRIEF DESCRIPTION OF THE DRAWING

These and other objects, features and advantages of the present invention will become more apparent from the following description when taken in connection with the accompanying drawing, which shows, for purposes of illustration only, one embodiment of a clamp structure in accordance with the present invention, and wherein:

FIG. 1 is a top plan view on a flat clamp structure in accordance with the present invention;

FIG. 2 is a side elevational view of the clamp structure of FIG. 1;

FIG. 3 is a bottom plan view on the clamp structure of FIG. 1;

FIG. 4 is a cross-sectional view, on a reduced scale, illustrating a clamp structure in accordance with the present invention, preassembled on an object to be fastened;

FIG. 5 is a cross-sectional view, on an enlarged scale, illustrating the details of the clamp structure in accordance with the present invention, with the tightening tool indicated in dash line and showing the parts of the clamp structure in the preassembled condition; and FIG. 6 is a cross-sectional view, similar to FIG. 5, illustrating the parts of the clamp structure in the assembled condition.

DETAILED DESCRIPTION OF THE INVENTION

Referring now to the drawing wherein like reference numerals are used throughout the various views to designate like parts, the clamp structure generally designated by reference numeral 10 which is adapted to be preassembled over an object to be fastened, for example, over a hose 11 intended to be fastened onto a nipple 12 (FIG. 4). The clamp structure 10 includes a clamping band 20 having an inner band portion 21 and an outer band portion 22 intended to mutually overlap when the clamp structure is in its preassembled and fully assembled condition. The inner band portion 21 includes one or more cold-deformed support hooks 23 adapted to engage in apertures 24 and 25 provided in the outer band portion 22. To assure a substantially gap-free stepless inner surface of the clamp structure, the inner band portion 21 is provided at its end with a tongue-like extension 26 adapted to engage in a tongue-receiving means generally designated by reference numeral 27. The tongue-receiving means includes a central pressed-out channel portion 28 formed by a first central step 29 leaving lateral band portions 30a and 30b at the initial level of the clamping band 20 which pass over into the level of the outwardly displaced channel portion 28 by a second step 31. The means to assure a gap-free stepless inner surface of the clamp structure may thereby be, as described in my prior U.S. Pat. Nos. 4,299,012 or 4,315,348.

To be able to tighten the clamp structure into its fully assembled position by the use of a tightening tool, shown in dash and dot lines in FIG. 5, the outer and inner band portions 22 and 21 are provided each with a pressed-out embossment 33 and 34 having a tool-engaging surface 33a and 34a, respectively. The pressed-out embossments 33 and 34 extend thereby generally in the circumferential direction so that each pressed-out portion remains integral at least on both sides thereof with the clamping band. The pressed-out embossments are thereby preferably of at least approximately semi-circularly shaped cross section. The details described so far are disclosed in my prior U.S. Pat. No. 4,492,004.

According to the present invention, the clamp structure is provided additionally with a snap-in preassembly means in the form of a preassembly hook 40 of rectangular configuration as viewed in plan view on the clamp structure (FIG. 1). The preassembly hook 40 includes a first portion 41 extending outwardly from the inner band portion 21. The first portion 41 is adjoined by a second portion 42 which extends at least approximately parallel to the outer surface of the inner band portion and is adjoined by a constriction 43 in the form, for example, of an approximately U-shaped depression that may extend over the entire width of the hook 40. The leg of the U-shaped depression 43 away from the free end of the inner band portion thereby preferably extends obliquely outwardly to form a guide surface 44 to guide the corresponding outer band portion underneath the U-shaped depression 43 for snap-in engagement in the preassembled condition. As can be seen in FIG. 5, the web 22a (FIG. 1) formed between the transverse wall 25a of the aperture 25 facing the free end of the outer band portion, and the transverse wall 24a of the aperture 24 away from the free end of the outer band portion engages underneath the preassembly hook 40 by engaging underneath the part 42 of the hook 40 by first sliding along the guide surface 44 and elastically opening the preassembly hook 40. To further assure a reliable preassembly, the length a of the web 22a in the longitudinal direction of the clamp structure (FIG. 1) should be no greater, but preferably somewhat smaller than the length b (FIG. 5) of the second part 42 of the preassembly hook 40 so that the web 22a is held in preassembled condition between the first part 41 of the hook 40 and the leg 45 of the U-shaped depression 43 nearer the free end of the inner band portion.

The preassembly arrangement according to the present invention holds the earless clamp structure reliably in preassembled position and thereby facilitates the engagement of the tightening tool with the abutment surfaces 33a and 34a of the pressed-out embossments 33 and 34. The operator installing the clamp structure on the assembly line no longer has to be concerned either with manually holding the clamp structure in a quasi-preassembled condition or with the holding ability of the preassembly arrangement as disclosed in my aforementioned U.S. Pat. No. 4,492,004. As the tightening tool tightens the clamp structure about the object to be fastened thereby by forcing the embossments 33 and 34 toward one another, the preassembly hook 40 again becomes automatically disengaged because such movement of the embossments 33 and 34 causes the preassembly hook 40 to be elastically opened again to move over the web 22a until the preassembly hook 40 becomes inoperable when it extends through the slot 25 which is of sufficient length to accommodate the preassembly hook 40 (FIG. 6).

Though the present invention is of particular usefulness with earless clamps for reasons pointed out above, it can also be used to advantage in other clamp structures which require a reliable preassembly that will not become released inadvertently in normal handling of the clamp structure.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An open clamp structure, comprising a clamping band having an inner band portion and an outer band portion, mechanical means with at least one outwardly extending hook means in the area near the free end of the inner band portion operable to engage in at least one complementary aperture means provided in the outer band portion for mechanically interconnecting the overlapping inner and outer band portions when the clamp structure is tightened about an object to be fastened thereby, and preassembly means in the clamping band for holding the clamp structure in a preassembled condition of at least generally complementary shape to but at least slightly larger than the object to be fastened prior to engagement of the hook means in the aperture means, said preassembly means being operable to provide a snap-in engagement retaining the outer band portion in the preassembled position relative to the inner band portion and operable to be automatically disengaged again during final installation of the clamp structure when during tightening of the clamp structure each hook means is caused to engage in the corresponding aperture means.

2. An open clamp structure according to claim 1, wherein said preassembly means includes a hook extending away from the free end of the inner band portion, said hook being punched out of the band material, a first part of said hook extending a relatively small distance outwardly from the outer surface of the clamping band and being thereafter bent to extend at least approximately parallel to the outer surface of the clamping band with a second, relatively larger part thereof, and said second part including constriction means providing in conjunction with the elastically deformable second part the snap-in engagement.

3. A clamp structure according to claim 2, wherein said constriction means is formed by an approximately U-shaped depression in the second part, as viewed in side view of the clamp structure.

4. A clamp structure according to claim 3, wherein said approximately U-shaped depression extends over substantially the entire width of the hook.

5. A clamp structure according to claim 4, wherein the outer band portion is provided with an aperture of such size that the hook can extend therethrough and the transverse end wall of said aperture can then engage into the space between the outer surface of the clamping band and the inner surface of the hook by elastically opening the constriction means.

6. A clamp structure according to claim 5, further comprising means to provide a substantially gap-free, stepless inner object-engaging surface in the clamp structure including a tongue-like extension at the free end of the inner band portion operable to engage in a tongue-receiving means near the free end of the outer band portion.

7. A clamp structure according to claim 6, wherein said tongue-receiving means includes a central pressed-out channel portion formed by two steps in the clamping band.

8. A clamp structure according to claim 7, wherein said hook means include at least one cold-deformed support hook.

9. A clamp structure according to claim 8, wherein said clamp structure is an earless clamp structure which includes tool-engaging means in the inner and outer band portions.

10. A clamp structure according to claim 9, wherein said tool-engaging means are formed by press-out portions pressed out of the inner and outer band portions and extending generally in the circumferential direction so that each pressed-out portion remains integral at least on both sides thereof with the clamping band.

11. A clamp structure according to claim 10, wherein said pressed-out portions are of at least approximately semi-circularly shaped cross section, and said aperture is of such length and the aperture and the pressed-out portion in the inner band are so located to each other and to said hook that said inner pressed-out portion extends through said aperture when the outer band portion is held in the preassembled position by the snap-in engagement produced by the hook of the preassembly means.

12. A clamp structure according to claim 5, wherein said aperture at the same time constitutes one of said aperture means operable to be engaged by the corresponding hook means.

13. A clamp structure according to claim 3, wherein the leg of the approximately U-shaped depression, away from said first part, extends obliquely upwardly and outwardly to form a guide surface for the outer band portion to engage underneath the hook.

14. A clamp structure according to claim 2, wherein the outer band portion is provided with an aperture of such size that the hook can extend therethrough and the transverse end wall of said aperture can then engage into the space between the outer surface of the clamping band and the inner surface of the hook by elastically opening the constriction means.

15. A clamp structure according to claim 14, wherein said constriction means is spaced from said first part a distance at least equal to the spacing in the clamping band between the aperture and next-adjacent aperture means.

16. A clamp structure according to claim 14, wherein said aperture at the same time constitutes one of said aperture means operable to be engaged by the corresponding hook means.

17. A clamp structure according to claim 1, wherein the snap-in engagement is automatically released during final installation of the clamp structure on the object to be fastened.

18. An open clamp structure according to claim 12, wherein said preassembly means includes a hook extending away from the free end of the inner band portion, said hook being punched out of the band material and being of at least approximately rectangular configuration, as viewed in plan view on the area of the clamp structure containing the hook, a first part of said hook extending a relatively small distance outwardly from the outer surface of the clamping band and being thereafter bent to extend at least approximately parallel to the outer surface of the clamping band with a second, relatively larger part thereof, and said second part including constriction means providing in conjunction with the elastically deformable second part the snap-in engagement.

19. A clamp structure according to claim 18, wherein said constriction means is formed by an approximately U-shaped depression in the second part, as viewed in side view of the clamp structure.

20. A clamp structure according to claim 19, wherein said approximately U-shaped depression extends over substantially the entire width of the hook.

* * * * *